Jan. 5, 1926.  
C. E. HARTVIG  
1,568,603  
ATTACHING DEVICE FOR ELECTRIC CABLES  
Filed March 3, 1922  5 Sheets-Sheet 1

Inventor  
Christian E. Hartvig  
by Barnett & Truman  
Attorneys

Jan. 5, 1926. 1,568,603
C. E. HARTVIG
ATTACHING DEVICE FOR ELECTRIC CABLES
Filed March 3, 1922 5 Sheets-Sheet 2
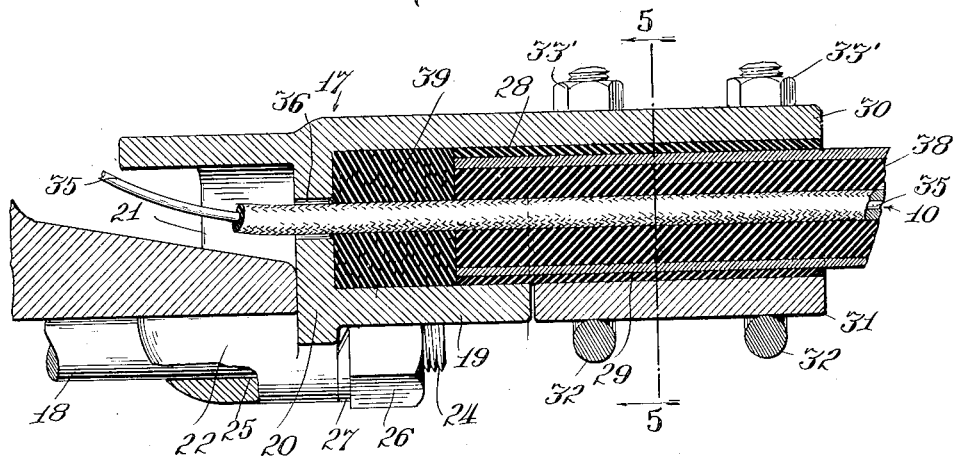
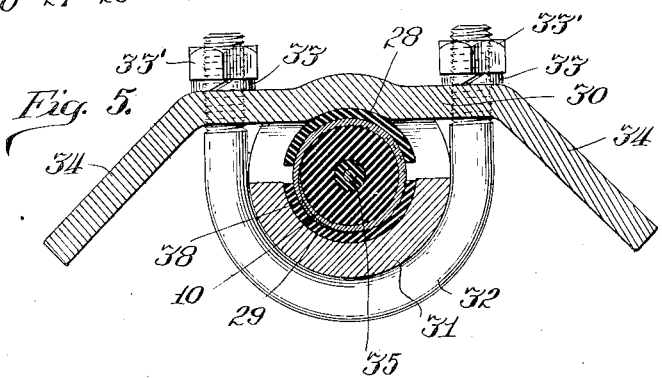
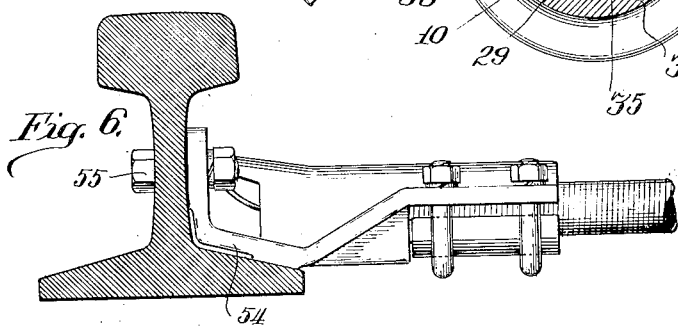
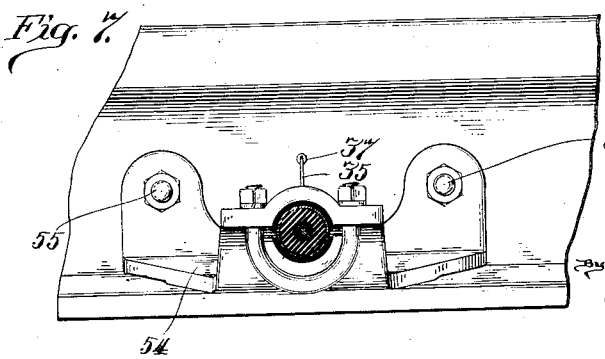

Jan. 5, 1926.
C. E. HARTVIG
1,568,603
ATTACHING DEVICE FOR ELECTRIC CABLES
Filed March 3, 1922    5 Sheets-Sheet 3
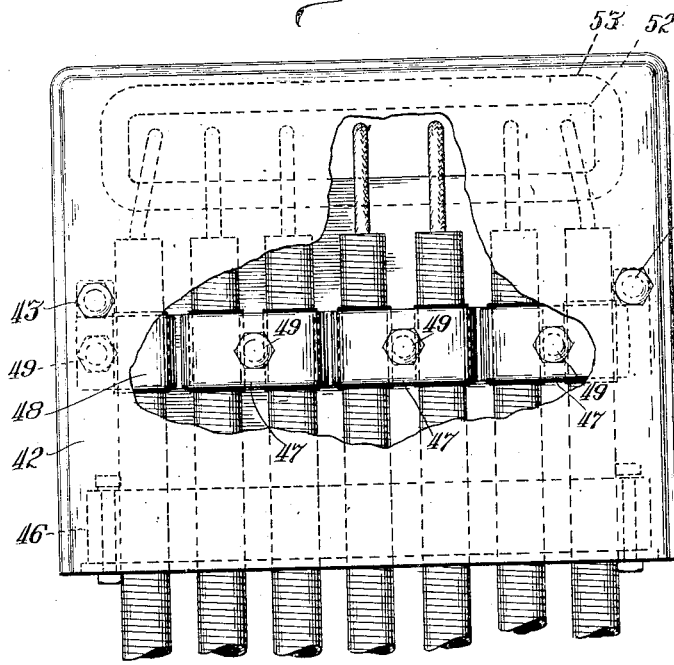
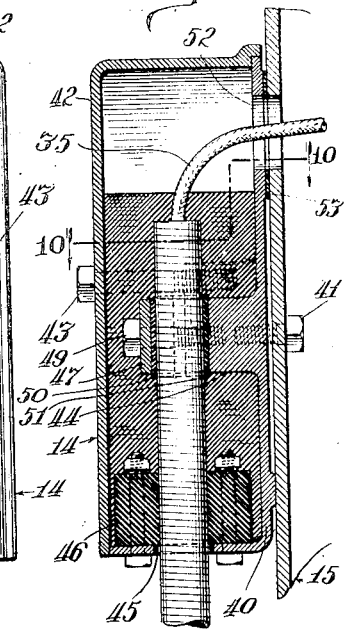
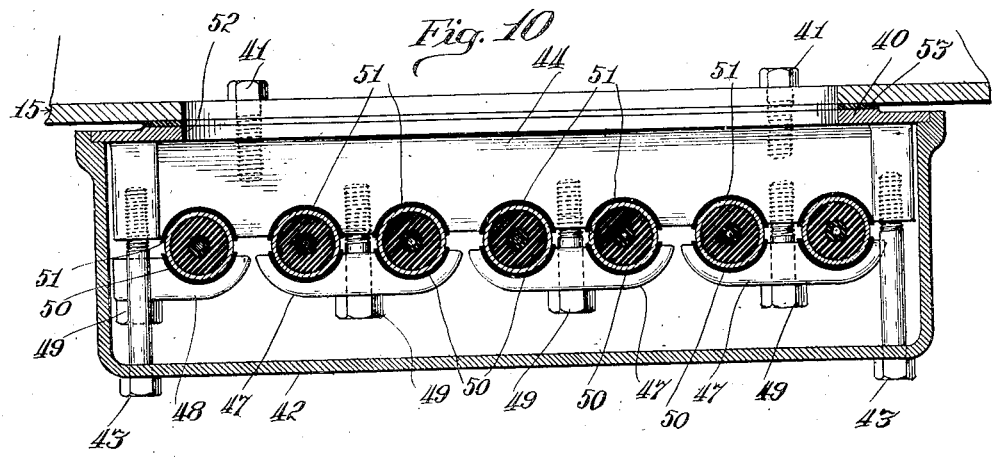
Christian E. Hartvig, Inventor
By Barnett & Truman, Attorneys Jan. 5, 1926. 1,568,603
C. E. HARTVIG
ATTACHING DEVICE FOR ELECTRIC CABLES
Filed March 3, 1922   5 Sheets-Sheet 4

Inventor
Christian E Hartvig
By Barnett & Truman
Attorneys

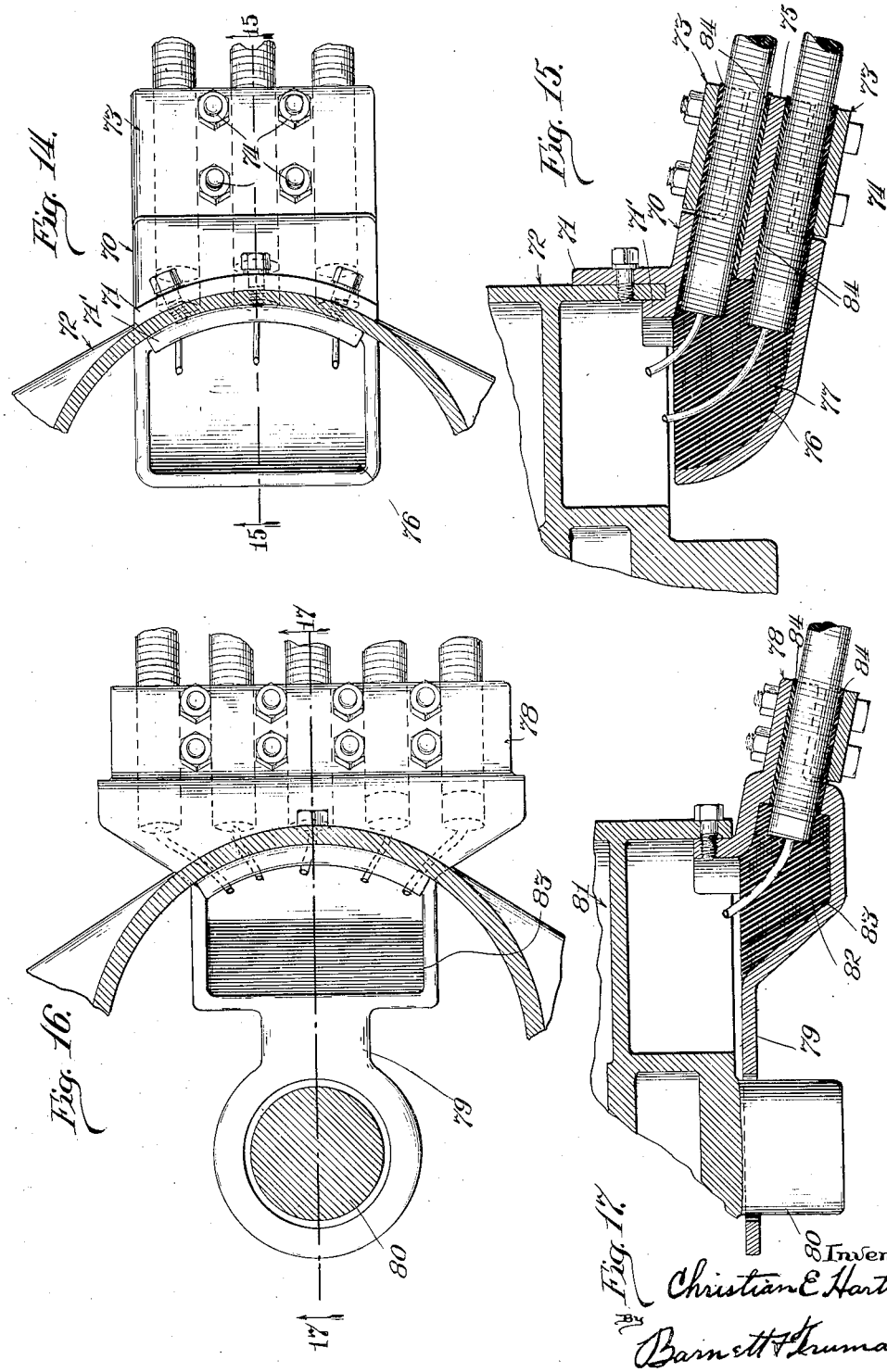

Patented Jan. 5, 1926.

1,568,603

UNITED STATES PATENT OFFICE.

CHRISTIAN E. HARTVIG, OF EL RENO, OKLAHOMA.

ATTACHING DEVICE FOR ELECTRIC CABLES.

Application filed March 3, 1922. Serial No. 540,766.

*To all whom it may concern:*

Be it known that I, CHRISTIAN E. HARTVIG, a citizen of the United States, residing at El Reno, in the county of Canadian and State of Oklahoma, have invented certain new and useful Improvements in Attaching Devices for Electric Cables, of which the following is a specification.

My invention relates to attaching devices for electric cables and has for its primary object the provision of novel and improved attaching devices whereby electric cables, particularly cables having a metallic armor, may be secured in place without danger of the development of grounded or shorted circuits.

A more specific object of the invention is to provide attaching devices for cables having a metallic armor, whereby such cables may be advantageously used in connection with the wiring for railway signaling and switching systems.

Prior to my invention it has been customary to use insulated wires for railway circuits of the above character and enclose them in conduits or trunkings extending from the point at which the circuit is closed to the mechanism controlled by or associated with such electric circuits. These trunkings are objectionable for the reason that they are expensive to construct and install and also require considerable expense to maintain them in such condition as to insure proper protection of the electric circuits. This is particularly true when the trunkings are made, as they usually are, of wood. I therefore contemplate, as one of the specific objects of this invention to provide means for overcoming the above mentioned and other incidental objections to the use of trunkings of the various constructions now in general use, which means, preferably, include the use of an armored cable that may be buried at a relatively shallow depth in the ground without danger of being damaged by the passage of heavy objects over it, and which, due to its construction, will provide the wire or wires of the cable, as the case may be, with adequate protection against moisture or other influences that tend to create grounded and short circuits in the wiring systems now in general use.

Another object is to provide improved devices for attaching armored cables to the housings or other parts of objects controlled by or associated with electric circuits and to so construct such devices that the armor of the cable will be thoroughly insulated from the electric conductor of the cable and the attaching device and to also seal the end of the cable so as to prevent moisture from entering between the electric conductors and insulation of the cable.

Another object is to provide improved attaching devices of the above character that may be readily applied to and removed from their operating positions, and which when applied will form in effect, parts of the objects with which they are connected.

The invention has for further objects the novel arrangements, constructions and combinations of parts and devices relating to electric circuits of the above character and to attaching devices for cables as will be hereinafter described and claimed for carrying out the above stated objects and such other objects as will appear from the following detailed description of my invention.

The invention is illustrated in certain preferred embodiments in the accompanying drawings, wherein:

Fig. 4 is a longitudinal section of a portion of the attaching device shown in Figs. 2 and 3, the section being taken on line 4—4 of Fig. 3.

Fig. 5 is a cross sectional view taken on line 5—5 of Fig. 4.

Fig. 6 is a view similar to Fig. 2, illustrating a modification.

Fig. 7 is an end view of the structure shown in Fig. 6.

Fig. 8 is a front view in elevation of another embodiment which is particularly suitable for supporting a plurality of cables and attaching them to the housing of a device associated with an electric circuit; this specific embodiment being shown as attached to the mechanism case of a railway signaling device.

Fig. 9 is a vertical section taken through the structure shown in Fig. 8.

Fig. 10 is a sectional view in plan taken on line 10—10 of Fig. 9, looking in the direction indicated by the arrows.

Fig. 14 is a plan view of another embodiment of my invention showing the same applied to a vertical rotary switch circuit controller, a portion of the switch circuit controller casing being shown in section.

Fig. 15 is a vertical sectional view taken on line 15—15 of the structure shown in Fig 14.

Fig. 16 is a modified construction of attaching device adapted to be used in connection with vertical rotary switch circuit controllers, and Fig. 17 is a vertical sectional view taken on line 17—17 of Fig. 16.

Like characters of reference designate corresponding parts throughout the several figures of the drawings.

Figure 1:
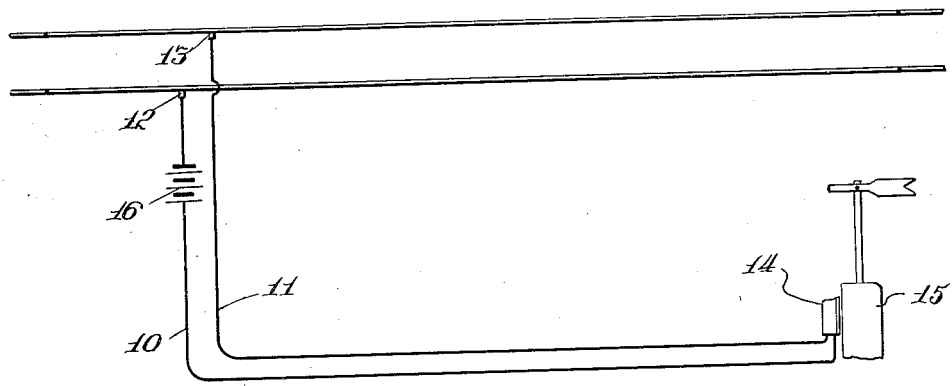
Fig. 1 is a diagrammatic view illustrating, for convenience only, one specific application of my invention to an electric circuit.
Figure 2:
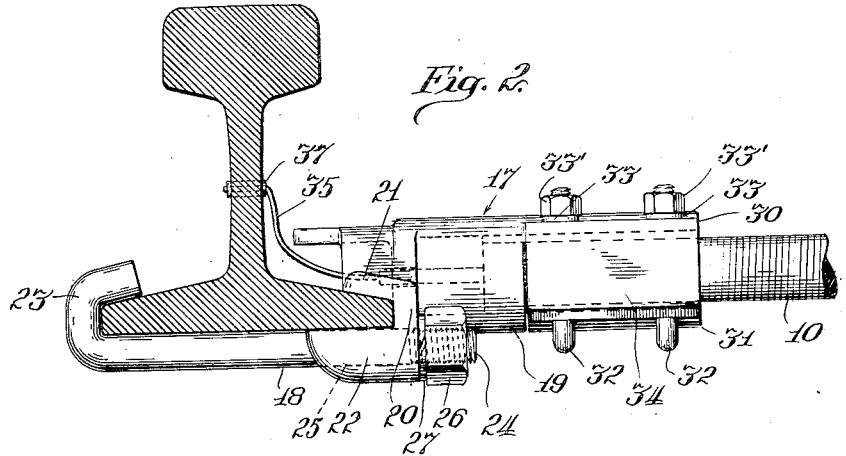
Fig. 2 is a side view, in elevation, of an attaching device, constructed in accordance with my invention, adapted to attach an electric cable to a railroad rail.
Figure 3:
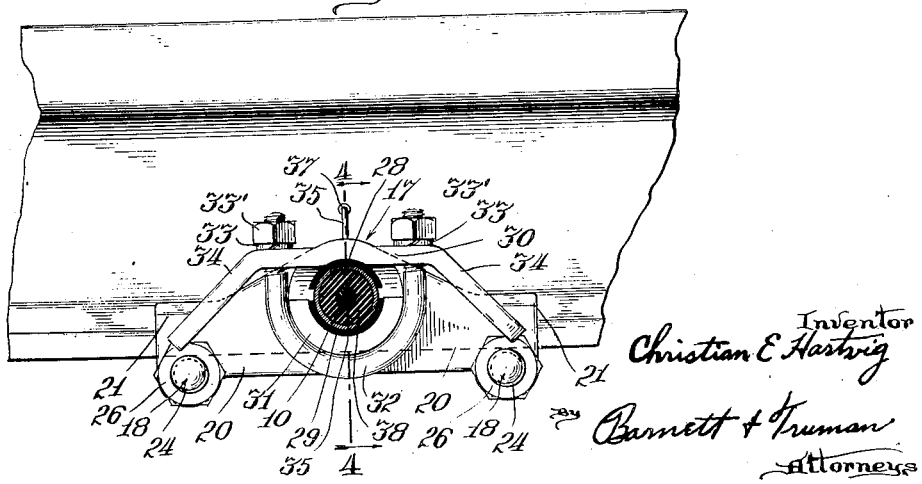
Fig. 3 is an end view of the structure shown in Fig. 2.

Referring first to Figs. 1 to 5 inclusive and 8 to 10 inclusive, wherein I have shown my invention, for convenience only, in connection with a railway track circuit adapted to control the operation of a semaphore signal.

In the above figures the reference characters 10 and 11 designate armored cables, which are preferably buried in the ground and their armor connected at their adjacent ends to the railroad rails by means of attaching devices designated generally at 12 and 13. The armor of the cables at their other ends are attached by means of an attaching device to the housing 15 enclosing the mechanism for operating the semaphore signal, the electric conductors being connected to the rails and to the operating mechanism, in any suitable manner. In electric circuits of this character, the electric batteries 16 are ordinarily enclosed in the housing 15, but in Fig. 1 I have shown them, for purposes of clearness interposed in the cable 10.

In railway track circuits it is important that the armor of the cable be thoroughly insulated from the railway rails so as to prevent grounded or short circuits. It is desirable to firmly attach the cable armor to the rail so that the vibration and longitudinal creeping movements of the rail will have no tendency to disconnect the electric conductor of the cable from its connection with the rail.

In Figs. 2 to 5 inclusive I have illustrated one embodiment of an attaching device that is particularly suitable for attaching the armor of a cable to a railroad rail. This embodiment consists of a body portion 17 and one or more clamping bolts 18 which together embrace the base of a rail. The body portion 17 is preferably formed with a tubular portion 19 and is provided with laterally projecting flanges 20—20 which terminate in upper and lower jaw members 21 and 22 adapted to fit over and bear against the upper and lower surfaces, respectively, of one of the base flanges of the rail.

The clamping bolts 18 are formed with hooks 23 adapted to engage with the other edge of the rail base and with threaded portions 24 which extend through openings 25 in the lower jaw members 22 of the body and receive nuts 26.

It will be seen that by tightening the nuts 26 the attaching device may be rigidly clamped to the base flange of the rail so that it will move with the rail. To maintain a tight engagement of the device on the rail base I preferably interpose spring washers 27 between the webs 20 and nuts 26 so as to prevent the vibration of the rail and other disturbing influences from loosening the nuts 26.

The end of the cable armor is inserted a short distance in the tubular portion of the body and is insulated from the walls thereof preferably, by means of half or split sleeve members 28—29 made of fibre or other suitable insulating material. The cable armor is clamped firmly to a web 30 of the body by means of a semi-circular metallic pad 31 and a plurality of U-bolts 32 or equivalent means, as shown best in Fig. 5 of the drawings.

Spring washers 33 are positioned between the nuts 33' of the U-bolts and the upper surface of said web 30 to prevent accidental loosening of the nuts. The ends of the web 30 are preferably inclined downwardly, as indicated at 34, so as to provide maximum protection for the cable and the means by which it is connected to the body portion of the attaching device. The electric conductor 35 of the cable extends through an opening 36 in the vertical web 20 and is secured to the rail in any suitable manner, for example, by means of a plug 37 (Fig. 2) driven in a small hole in the web of the rail.

In order to thoroughly seal the end of the cable so as to prevent any moisture from entering between the electric conductors 35 and the layers of insulation 38 of the cable, as well as between the armor and said layers of insulation I fill the tubular portion 19 of the body member with a suitable sealing material, 39, preferably petroleum asphaltum, which it will be seen, in addition to excluding moisture, will also provide means for further insulating the cable armor and the electric conductor from the body of the attaching device.

From the above description it will be seen that the use of an attaching device of the above character, permits the use of an armored cable in connection with railway track circuits, whereby providing greater protection for the electric wire and its connection with the rail and at the same time avoid the many disadvantages incident to the use of the specially constructed trunkings and "bootlegs" now in general use in connection with the wiring of railway track circuits.

The other ends of the armored cables may be connected with various types of devices controlled by or associated with the electric circuit. In Fig. 1 of the drawings I show the ends of the cables 10 and 11 supported by an attaching device 14, which device is particularly suitable for attaching the cables to the mechanism case of a railway signal. Such attaching device, however, may obviously be used in other analogous situations. In Fig. 1 I have shown two cables only leading into the mechanism case 15 though the attaching devices, indicated by the reference character 14, may be, and preferably are constructed to accommodate any desired number of cables.

In Figs. 8 to 10 inclusive I have shown a detailed construction of an attaching device of the character shown at 14 in Fig. 1. In this embodiment the attaching device consists of a housing comprising a back plate 40 adapted to be secured to the signal mechanism case 15 or other desired structure by means of bolts 41, and an angular cover member 42 which is preferably secured by bolts 43 to the back plate. The back plate 40 is formed with a rib 44 having semi-circular recesses providing seats for each of the cables. The cables extend through openings 45 in the bottom of the housing and are, preferably though not necessarily, held out of contact with the housing by means of an insulating block 46. The upper end of each cable, or pair of cables, as the case may be, are clamped against the rib 44 by means of clamping bars 47—48 and bolts 49. The cables are, preferably though not necessarily, insulated from the rib 44 and clamping bars by means of split sleeve members 50—51 of fibre or other suitable insulating material. The electric conductor of the cable will, ordinarily, have no contact with the mechanism case and therefore avoids the necessity of insulating this end of the cable armor from the attaching device.

The electric conductors 35 of the cable pass out of the housing of the attaching device through an opening 52 in the back plate 40. When the back plate 40 is attached to the wall of a mechanism case or other device, a gasket 53 is positioned between the back plate and the said wall so as to prevent moisture from entering the interior of the attaching device and mechanism case. The casing of the attaching device may be, and preferably is, under conditions likely to expose the ends of the cables to moisture, filled with petroleum asphaltum or other suitable sealing and insulating material.

In Figs. 6 and 7 I have shown a modification of the attaching device shown in Figs. 2 to 5 inclusive. In this modification, the attaching device instead of being formed with jaws adapted to fit over one edge of the rail base and clamped thereto by means of a bolt engaging the opposite edge of the rail base, is formed with an angular spaced portion 54 which seats upon the inclined surface of one of the base flanges of the rail and is bolted by bolt 55 to the vertical web of the rail. In other respects this modified construction may be made substantially the same as that illustrated in Figs. 2 to 5 inclusive.

Figure 11:
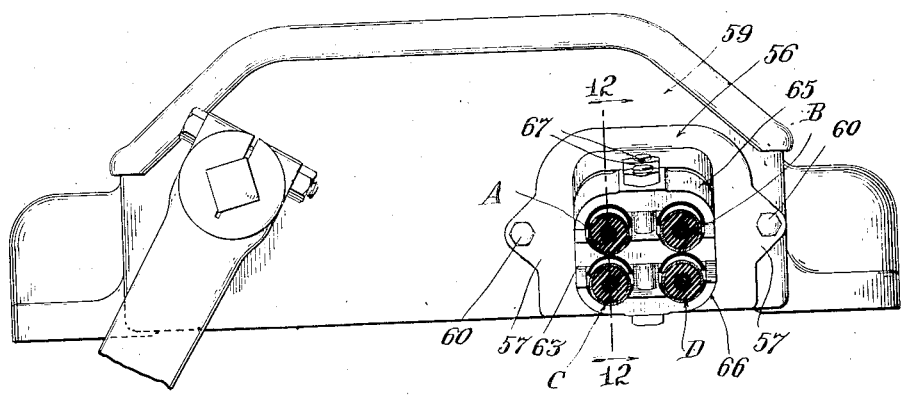
Fig. 11 is another embodiment of my invention adapted to support a plurality of cables, this device being shown in connection with a type of switch circuit controller now extensively used in railway electric circuits.
Figure 12:
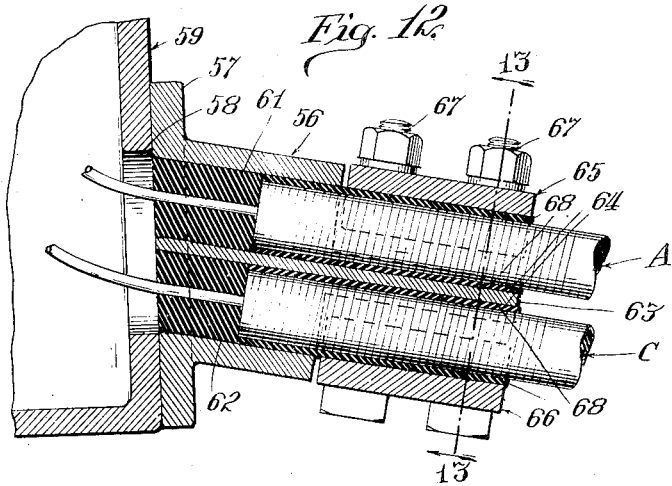
Fig. 12 is a longitudinal sectional view taken on line 12—12 of Fig. 11, this figure being shown on a larger scale.
Figure 13:
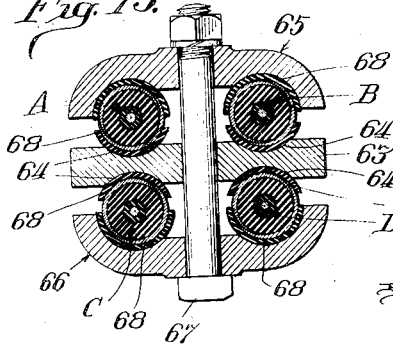
Fig. 13 is a cross sectional view taken on line 13—13 of Fig. 12.

In Figs. 11, 12 and 13 I have shown an embodiment which is particularly suitable for use in connection with one type of track switch circuit controller for railway electric circuits. In this embodiment the attaching device consists of a tubular body 56 having attaching flanges 57 adapted to fit over an opening 58 in the circuit controller housing 59 and be bolted thereto by bolts 60. The tubular portion of the body is divided into two chambers 61—62 by means of a web 63 having recesses 64 providing seats for the cables A—B—C and D. The cables are clamped against the web 63 by clamping bars 65—66 and bolts 67; fibre insulating sleeves 68 being, preferably though not necessarily, interposed between the cable armor and the web 63 and clamping bars so as to insulate the cable armor from the attaching devices. The chambers 61 and 62 are preferably filled, as in the other embodiments, with petroleum asphaltum to seal the ends of the cables.

In Figs. 14 and 15 I have shown a device similar to that of Figs. 11, 12 and 13, which is suitable for attaching a plurality of superposed cables to a track switch circuit controller of the "vertical rotary" type. In this modification the tubular body portion 70 is provided with upstanding flanges 71—71' which fit over a depending flange of the circuit controller housing 72. The cables are clamped by means of clamping bars 73—73 and bolts 74 to a central web 75 and the chamber 76 filled with petroleum asphaltum or a suitable insulating compound 77.

In Figs. 16 and 17 I have shown another modification adapted for use on track switch circuit controllers of the general type shown in Figs. 14 and 15. In this embodiment the cables instead of being supported in a superposed position are arranged side by side and clamped to a top flange 78 of the device. An inwardly projecting portion 79 is formed with an opening which fits over a vertical shaft 80 of the controller device 81. 82 designates insulating material in the chamber 83 of the body. In Figs. 16 and 17, and likewise in Figs. 14 and 15, the cables are, preferably though not necessarily, insulated from the devices by means of fibre sleeve members 84 or other suitable insulating material.

I claim:

1. The combination with an electric cable, of an attaching device, for attaching said cable to an object, comprising a housing for one end of the cable, insulating means around said cable to seal its end and insulate it from the housing, clamping devices for clamping the cable to the housing, and means for securing the housing to said object.

2. The combination with an electric cable having a metallic armor, of an attaching device, for attaching said cable to an object, comprising a housing for one end of the cable, insulating sleeve members intervening between the armor of the cable and said housing, clamping devices for clamping the cable to the housing, and means for securing the housing to said object.

3. The combination with an electric cable having a metallic armor, of an attaching device, for attaching said cable to an object, comprising a housing for one end of the cable, insulating sleeve members intervening between the armor of the cable and said housing, clamping devices for clamping the cable to the housing, and means for securing the housing to said object, said housing being provided with a chamber and a body of insulating material in said chamber to seal the end of said cable.

4. In railway electric circuit wiring, the combination of an armored cable the armor of which is grounded, and means for anchoring the cable to a device associated with said electric circuit, comprising a housing for the end of the cable and means for sealing and insulating the cable from said housing.

5. In a railway electric circuit wiring, the combination of an armored cable the armor of which is grounded, and means for anchoring the cable to a device associated with said electric circuit, comprising a housing having a chamber to receive the end of the cable, and a body of insulating material in said chamber to seal the end of the cable and insulate it from said housing.

6. In railway electric circuit wiring, the combination of an armored cable the armor of which is grounded, and means for anchoring the cable to a rail associated with said electric circuit, comprising a housing having a chamber to receive the end of the cable and a body of insulating material in said chamber to seal the end of the cable and insulate it from said housing.

7. In railway electric circuit wiring, the combination with an armored cable the body of which is grounded, of means for anchoring one end of the cable to a device associated with said electric circuit, comprising a housing, means for clamping the armor of the cable to said housing and insulating devices intervening between the cable armor and said clamping device; said housing being provided with a chamber to receive the end of the cable, and a body of insulating material to seal the end of said cable.

8. In a railway electric circuit wiring, the combination with an armored cable the armor of which is grounded, of means for anchoring one end of the cable to a device associated with said electric circuit, comprising a housing having a chamber to receive one end of the cable, means for clamping the armor of the cable to said housing a body of plastic material in said chamber to seal the end of said cable, and insulating devices intervening between the cable armor and said clamping device.

9. In railway electric circuit wiring, the combination with an armored cable the armor of which is grounded, of means for anchoring one end of the cable to a device associated with said electric circuit, comprising a housing, means for clamping the armor of the cable to said housing and insulating sleeve members intervening between said cable armor and said clamping devices; said housing being provided with a chamber to receive the end of the cable, and a body of material in said chamber for sealing the end of the cable so as to exclude moisture therefrom.

10. In a railway track circuit, the combination with an electric cable, of means for attaching the cable to a railroad rail comprising a housing for the end of the cable, means for clamping the cable to the housing, insulating sleeve members intervening between the housing and cable, and means for clamping said housing to said rail; said housing being formed with a chamber to receive the end of the cable and to contain a material to seal the end of the cable and insulate the same from the housing.

11. In a railway track circuit, the combination with an electric cable, of means for attaching the cable to a railroad rail comprising a housing for the end of the cable, means for clamping the cable to the housing, insulating sleeve members intervening between the housing and cable, and means for clamping said housing to said rail, comprising a clamping member extending under the rail and formed with a jaw to engage with the opposite edge of the rail base; said housing being formed with downwardly projecting flanges to protect said cable and with a chamber to receive the end of the cable and to contain a material to seal the end of the cable and insulate the same from the housing.

CHRISTIAN E. HARTVIG.

Certificate of Correction.

It is hereby certified that in Letters Patent No. 1,568,603, granted January 5, 1926, upon the application of Christian E. Hartvig, of El Reno, Oklahoma, for an improvement in "Attaching Devices for Electric Cables," errors appear in the printed specification requiring correction as follows: Page 3, line 18, for the word "whereby" read *thereby;* page 4, line 60, claim 7, for the word "body" read *armor;* and that the said Letters Patent should be read with these corrections therein that the same may conform to the record of the case in the Patent Office.

Signed and sealed this 2d day of February, A. D. 1926.

[SEAL.]

WM. A. KINNAN,
*Acting Commissioner of Patents.*